United States Patent
Yamada et al.

[11] Patent Number: 6,040,092
[45] Date of Patent: *Mar. 21, 2000

[54] NONAQUEOUS SECONDARY BATTERY

[75] Inventors: Kazuo Yamada, Kitakatsuragi-gun; Takehito Mitate, Yamatotakada; Naoto Nishimura, Kitakatsuragi-gun; Yoshihiro Tsukuda; Kazuaki Minato, both of Osaka, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/772,255

[22] Filed: Dec. 23, 1996

[30] Foreign Application Priority Data

Dec. 25, 1995 [JP] Japan ................... 7-336697
Dec. 6, 1996 [JP] Japan ................... 8-326371

[51] Int. Cl.[7] .............. H01M 10/40; H01M 6/16; H01M 4/58
[52] U.S. Cl. .............. 429/331; 429/231.8; 429/332
[58] Field of Search ................ 429/194, 197, 429/218, 231.8, 331, 332

[56] References Cited

U.S. PATENT DOCUMENTS

| | | | |
|---|---|---|---|
| 5,028,500 | 7/1991 | Fong et al. | 429/194 |
| 5,069,683 | 12/1991 | Fong et al. | 429/218 X |
| 5,310,553 | 5/1994 | Simon et al. | |
| 5,344,724 | 9/1994 | Ozaki et al. | |
| 5,344,726 | 9/1994 | Tanaka et al. | |
| 5,723,232 | 3/1998 | Yamada et al. | 429/245 |
| 5,776,610 | 7/1998 | Yamada et al. | 428/403 |

FOREIGN PATENT DOCUMENTS

| | | |
|---|---|---|
| 0 517 070 | 12/1992 | European Pat. Off. |
| 0 520 667 | 12/1992 | European Pat. Off. |
| 808798A2 | 11/1997 | European Pat. Off. |
| 7-153446 | 6/1909 | Japan |
| 4-61747 | 2/1992 | Japan |
| 4-368778 | 12/1992 | Japan |
| 4-370662 | 12/1992 | Japan |
| 5-190209 | 7/1993 | Japan |
| 5-275076 | 10/1993 | Japan |
| 5-290889 | 11/1993 | Japan |
| 6-20690 | 1/1994 | Japan |
| 6-84516 | 3/1994 | Japan |
| 6-140076 | 5/1994 | Japan |
| 6-290809 | 10/1994 | Japan |
| WO 90/13924 | 11/1990 | WIPO |

OTHER PUBLICATIONS

Kuribayashi et al., "Battery Characteristics with Various Carbonaceous Materials", *Journal of Power Sources*, vol. 54, Mar. 1995, pp. 1–5.

*Primary Examiner*—Maria Nuzzolillo
*Assistant Examiner*—Jonathan Crepeau
*Attorney, Agent, or Firm*—Nixon & Vanderhye P.C.

[57] ABSTRACT

A nonaqueous secondary battery includes a working electrode containing graphite particles coated with less crystallized carbon and a nonaqueous electrolyte, which contains at least ethylene carbonate and propylene carbonate.

14 Claims, 3 Drawing Sheets

- ◆ DISCHARGE CAPACITY BY COMPARISON EXAMPLE 1
- ■ DISCHARGE CAPACITY BY EMBODIMENT 1
- ▲ CHARGE/DISCHARGE EFFICIENCY BY COMPARISON EXAMPLE 1
- × CHARGE/DISCHARGE EFFICIENCY BY EMBODIMENT 1

NONAQUEOUS SECONDARY BATTERY

BACKGROUND OF THE INVENTION

1. Field of the Invention

The present invention relates generally to secondary batteries, and more particularly to an improvement of a nonaqueous type secondary battery containing a carbon material as active material for a negative electrode and a nonaqueous electrolyte.

2. Description of the Background Art

Portable electronic or information equipment has been made greatly smaller or lighter in recent years, and secondary batteries for driving such portable equipment have been recognized as a critical part as a result. The lightweight lithium secondary battery with a high energy density which is regarded as a promising power source for driving portable equipment has been actively researched and studied. If a lithium metal is used as a negative electrode, however, repetition of charge/discharge cycles allows dendrites to grow on the lithium metal and an internal short circuit results. While use of a lithium alloy containing aluminum in place of a lithium metal has been proposed, repetition of charge/discharge cycles or deep charge/discharge causes segregation of the alloy, and sufficient battery characteristics may not be obtained.

It is why a battery containing a carbon material as a host material and having a negative electrode which takes advantage of intercalation and deintercalation reactions of lithium ions has been developed and reduced to practice. Such a lithium secondary battery using a carbon material for a negative electrode is excellent in terms of charge/discharge cycle characteristics and safety. However, carbon takes various forms from graphite to amorphous carbon, and the crystal structure or the microtexture of carbon materials greatly affect the performance of a resultant electrode, and therefore various carbon materials have been proposed as an electrode material.

Among such carbon materials, use of a graphitized carbon material provides a charge/discharge capacity approximate to a theoretical value, while the potential during charge/discharge is vary flat and very close to the potential at which lithium dissolves and precipitates, and therefore a battery with a high capacity and a sufficient charge/discharge potential may be implemented.

Such a graphite material which tends to cause decomposition of an electrolyte by its high crystalinity is known to be applicable as a negative electrode only if used with an electrolyte containing a particular organic solvent. If the negative electrode contains a graphite material, the kind of applicable electrolyte is limited, and an improvement of the temperature characteristics or charge/discharge cycle characteristics of the battery based on a selection of electrolyte is restricted to a great extent.

Propylene carbonate, for example, has good stability in oxidative decomposition and a low freezing point (−70° C.), and is extensively used as a useful electrolyte for a lithium battery. It is reported however that if an electrolyte containing propylene carbonate is used with an electrode containing graphite, the presence of graphite intensifies the decomposition reaction of electrolyte and that charge/discharge for a graphite containing electrode cannot be carried out if the electrolyte contains only 10% propylene carbonate (see J. Electrochem. Soc., Vol. 142, 1995, pp. 1746–1752).

In order to solve such a problem, Japanese Patent Laying-Open No. 4-368778 proposes use of a carbon material produced by coating the surface of graphite particles with amorphous carbon as an electrode material. Such coated graphite particles reduce decomposition of an electrolyte, effectively increase the capacity of a battery and improve the charge/discharge cycle characteristic. On the other hand, propylene carbonate is very sensitive to the surface of graphite. In the manufacture of a battery using an electrolyte with propylene carbonate as a main component, as the coated graphite particles are ground or classified to have the same size in the manufacturing process or the graphite particles are kneaded with a binder or applied onto a current collector, if amorphous carbon coating the surface of graphite particles partly comes off, gas generated by decomposition of the electrolyte at the portion damages the electrode, resulting in a decrease in the capacity of the battery or degradation of the charge/discharge cycle characteristic. As a result, a battery having sufficiently high capacity cannot be manufactured and a low yield results. In order to solve such a problem it would be desirable to form an amorphous carbon coating layer with a sufficient thickness on graphite particles. As to this kind of carbon material, however, graphite with high crystallinity determines charge/discharge capacity. Increase in the ratio of amorphous carbon coating relative to graphite particles reduces the charge/discharge capacity, and therefore, improvement of the yield of batteries is achieved at the cost of capacity.

As a manufacturing method which would require a reduced manufacturing cost, there is a method of baking a mixture of a carbon precursor such as pitch and graphite particles. According to the method, since the procedure goes through the step with the liquid phase, graphite particles coated with less-crystallized carbon inevitably tend to stick with each other. The step of separating the coated graphite particles by grinding is necessary to control the thickness of a resultant electrode. As a result of such a step, the active surface of graphite particles is partly exposed which causes decomposition of propylene carbonate.

SUMMARY OF THE INVENTION

In view of the foregoing background art, it is an object of the invention to provide a nonaqueous type secondary battery with a negative electrode containing graphite particles which has a high capacity and is less costly to manufacture.

A nonaqueous secondary battery according to one aspect of the invention includes a negative electrode containing graphite particles coated with less crystallized carbon and an organic electrolyte which contains at least ethylene carbonate and propylene carbonate.

Note that the term "less crystallized carbon" used in the specification means amorphous carbon, extremely fine crystalline carbon, or a mixture thereof.

The foregoing and other objects, features, aspects and advantages of the present invention will become more apparent from the following detailed description of the present invention when taken in conjunction with the accompanying drawings.

DETAILED DESCRIPTION OF EXEMPLARY EMBODIMENTS

Figure 1:
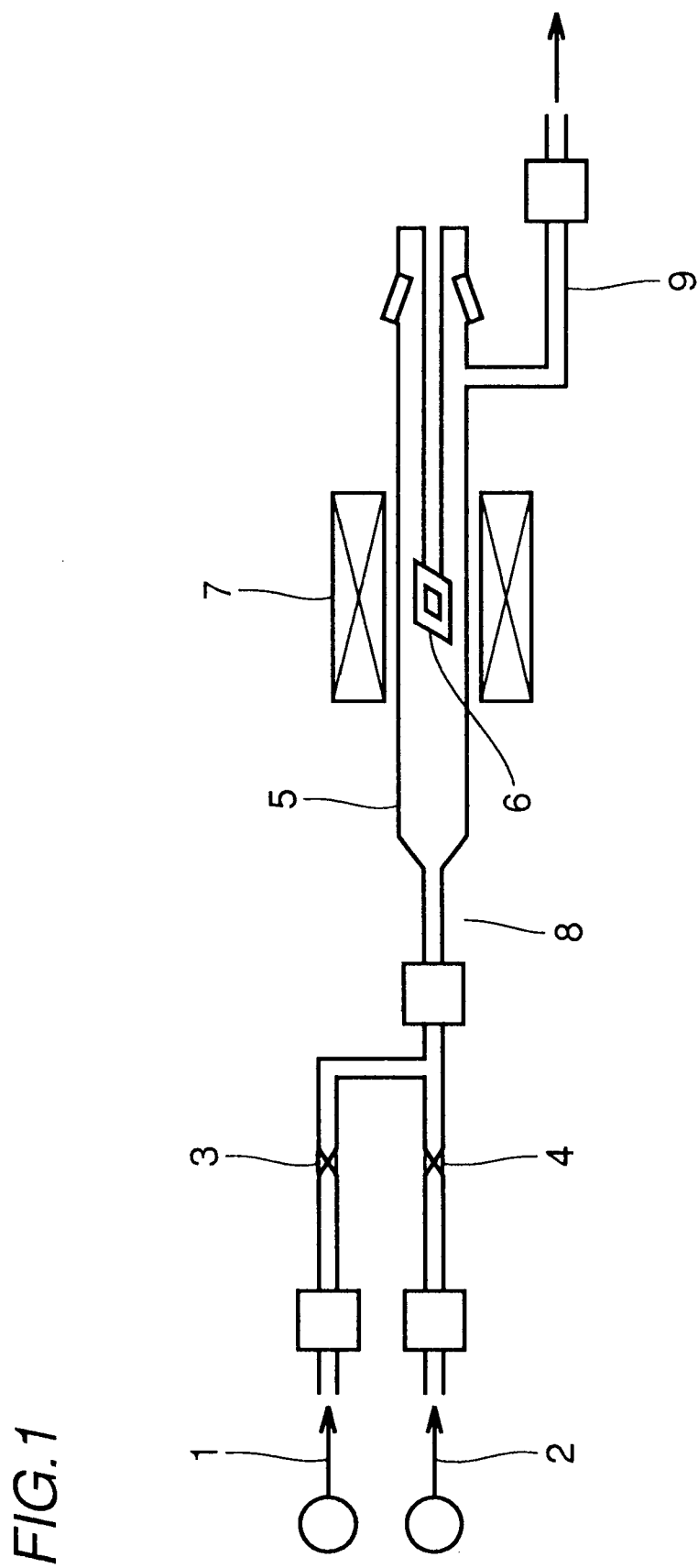
FIG. 1 is a schematic diagram for use in illustration of an apparatus for manufacturing a carbon material used according to the present invention.

The study by the inventors to overcome the problem associated with the background art as described above has revealed that in use of a negative electrode containing graphite particles coated with less crystallized carbon, adding ethylene carbonate to an electrolyte containing propylene carbonate increases the stability of the electrode. In addition, it was found that if ethylene carbonate is added to the electrolyte, coating at least part of the surface of each graphite particle only with a slight amount of less crystallized carbon effectively restricts the electrolyte from decomposing and that the thickness to coat the less crystallized carbon believed to be necessary may be greatly reduced.

The nonaqueous type secondary battery according to the present invention therefore contains graphite particles coated with less crystallized carbon as a negative electrode active material and an organic electrolyte, which contains at least ethylene carbonate and propylene carbonate.

For graphite particles, the interlayer spacing $d_{002}$ between (002) planes measured by X-ray diffraction is in the range from 0.335 to 0.340 nm, the thickness of crystallite Lc in the direction orthogonal to (002) plane and the thickness of crystallite La in the direction orthogonal to (110) plane are preferably not less than 10 nm. In argon laser Raman scattering related to graphite particles, the ratio R of a peak intensity in the vicinity of 1360 cm$^{-1}$ to a peak intensity in the vicinity of 1580 cm$^{-1}$ is preferably not more than 0.4. More specifically, if $d_{002}>0.340$ nm, Lc<10 nm, La<10 nm, or R>0.4, the crystallinity of graphite particles is not enough, and when the surface of graphite particles is coated with less crystallized carbon, the capacity of an electrode at a low potential portion (at 0 to 300 mV with respect to the reference potential of Li) at which lithium dissolves and precipitates is not enough, and the capacity of the battery at the voltage of actual use would not be enough.

For the less crystallized carbon coating graphite particles, the weight ratio of "less crystallized carbon/(less crystallized carbon+graphite)" is preferably not more than 0.2, and more preferably not more than 0.1. If the weight ratio of less crystallized carbon is larger than 0.2, the capacity at the low potential portion depending on the graphite particles decreases, and therefore a battery with sufficient capacity can not be obtained.

The graphite particles coated with less crystallized carbon preferably exhibit crystal parameters such as $d_{002}$=0.335 to 0.340 nm, Lc>10 nm, La>10 nm and R>0.4.

In general, the crystal parameters measured by x-ray diffraction reflect the properties of the bulk of graphite particles, and the measurement by Raman spectroscopy reflects the physical properties of the surface of a material. More specifically, the coated graphite particles preferably have high crystallinity as the property of the bulk, and the surface preferably has low crystallinity. If the graphite particles have an R value smaller than 0.4 even after coated with less crystallized carbon, the crystallinity of the surface of these coated graphite particles which is still high causes propylene carbon contained in the electrolyte to decompose, and a battery having a good charge/discharge efficiency cannot be obtained.

A graphite material having preferable crystal parameters as described above includes natural graphite, kish graphite, artificial graphite derived from petroleum coke or coal pitch coke or exfoliated graphite. Such graphite may be in any form such as spherical, flaky, fibrous, or ground, and preferably in the form of spherical, flaky, or ground.

The less crystallized carbon material for coating graphite particles is preferably thermally decomposed carbon deposited by vapor phase thermal decomposition of a hydrocarbon gas. The less crystallized carbon coating may be also formed by baking a mixture of a carbon precursor such as pitch and tar and graphite particles. In addition, the less crystallized graphite portion may be formed by baking a thermally melted polymer material or a polymer material dissolved in a solvent and applied on the surface of the graphite particles. The thus-derived coated graphite particles are ground and classified as desired for use as a main material for a negative electrode. In forming the negative electrode, the coated graphite particles are mixed with an appropriate binder, and the mixture is applied on a current collector to form an active material layer.

For the binder, fluoro type polymer such as polytetrafluoroethylene, polyvinylidene fluoride; polyolefin type polymer such as polyethylene, polypropylene; or synthetic rubber may be used. The amount of the binder is preferably in the range from 3 weight parts to 50 weight parts relative to 100 weight parts of the active material, more preferably in the range from 5 weight parts to 20 weight parts, and furthermore preferably in the range from 5 weight parts to 15 weight parts. An excess amount of binder is not preferable, because the density of the active material in the electrode is reduced. Conversely, an excessively small amount of binder keeps the active material from being surely retained in the electrode, and therefore, the stability of the electrode is lowered.

While the organic electrolyte should contain as solvents propylene carbonate and ethylene carbonate, it may additionally contain a third solvent such as ester family members such as butylene carbonate, diethylcarbonate, dimethylcarbonate, methylethylcarbonate, and γ-butylolactone; ether family members such as substituent tetrahydrofuran such as tetrahydrofuran and 2-methyltetrahydrofuran, dioxolane, diethyl ether, dimethoxyethane, diethoxyethane, and methoxyethoxy ethane; dimethyl sulfoxide; sulfolane; methylsulfolane; acetonitrile; methyl formate; methyl acetate or the like.

Herein, for propylene carbonate (PC) and ethylene carbonate (EC), the ratio of PC/(PC+EC) by volume is preferably in the range from 0.1 to 0.9, and more preferably in the range from 0.1 to 0.5. A combination of an electrolyte containing solvents having such a composition ratio and graphite particles coated with less crystallized carbon provides a battery having a flat charge/discharge potential curve, a large charge/discharge capacity and an excellent characteristic at low temperatures. The additional third solvent as described above improves the ion conductivity of electrolyte at low temperatures, and therefore, the low temperature characteristic of the battery may further be improved. The third solvent to be added preferably has a viscosity lower than PC and EC. For example, diethylcarbonate, dimethylcarbonate, or methylethylcarbonate may preferably be used, and methylethylcarbonate may be most preferably used.

If the electrolyte contains the third solvent, the ratio of (low viscosity solvent/whole solvent) by volume is preferably more than 0 and equal to or lower than 0.8, and more preferably in the range from 0.2 to 0.8. As to ethylene carbonate, the ratio of (EC/whole solvent) by volume is preferably equal to or smaller than 0.4, and for propylene carbonate, the ratio of (PC/whole solvent) by volume is preferably equal to 0.4 or smaller. Combining an electrolyte containing solvents in such a composition and graphite particles coated with less crystallized carbon permits a secondary battery having a high capacity and a good lower temperature characteristic to be obtained.

Listed as electrolyte is a lithium salt such as lithium perchlorate, lithium borofluoride, lithium phosphofluoride, arsenic lithium hexafluoride, lithium trifluoromethanesulfonate, halogenated lithium, and lithium chloroaluminate, and a mixture of at least one kind of them may be used.

For a positive electrode in the lithium secondary battery according the invention, oxide containing lithium such as $LiCoO_2$, $LiNiO_2$, $LiFeO_2$, $LiMnO_2$, $Li_xM_yT_zO_2$ (M represent one of Fe, Co, Ni, and T represents a transition metal or a metal of 4B or 5B family), $LiMn_2O_4$, $LiMn_{2-x}T_yO_4$, $LiVo_2$ may be used. The positive electrode may be formed by mixing a conductive material and a binder in such oxide containing lithium and if desired by further adding a solid electrolyte. In the mixing ratio at the time, for 100 weight parts of the active material, the conductive material in the range from 5 to 50 weight parts and the binder in the range from 1 to 30 weight parts can be mixed.

For the conductive material, carbon black (acetylene black, thermal black, channel black, for example), graphite powder, metal powder or the like may be used.

For the binder, fluoropolymer such as polytetrafluoroethylene and polyvinylidene fluoride, or polyolefin based polymer such as polypropylene, polyethylene, and synthetic rubber may be used.

If the conductive material of less than 5 weight parts is contained or if the binder of more than 30 weight parts is contained, the resistance and polarization of the positive electrode increase, reducing discharge capacity, and therefore, a lithium secondary battery for practical use cannot be fabricated. Though a preferable ratio of a conductive material depends on its kind, if the conductive material is contained in more than 50 weight parts, the active material contained in the positive electrode decreases, reducing the discharge capacity of the positive electrode. If the binder is contained in less than 1 weight part, the binding ability drastically drops. Meanwhile, if the binder is contained in more than 30 weight parts, the active material contained in the positive electrode decreases and the resistance and polarization of the positive electrode increase, reducing the discharge capacity of the positive electrode, which is not for practical use. Note that in the manufacture of the positive electrode, thermal treatment is preferably performed at a temperature in the vicinity of the melting point of the binder used in order to reinforce the binding ability between particles within the positive electrode.

For a separator for retaining an electrolyte, non-woven fabric or fabric of electrically insulating synthetic resin fiber, glass fiber, natural fiber or the like, or powder compact of alumina for example may be used. Above all, non-woven fabric of synthetic resin such as polyethylene or polypropylene is preferable in view of the stability and quality. A separator formed of such non-woven fabric and synthetic resin which solves and functions to shield between the positive electrode and negative electrode if the battery abnormally generates heat is preferable also in view of the safety of the battery. Although not particularly specified, the thickness of the separator needs only be enough for retaining a necessary amount of electrolyte and preventing a short circuit between the positive and negative electrodes. The thickness of the separator is usually in the range of 0.01 mm to 1 mm, and preferably in the range of 0.02 to 0.05.

According to the invention, a high performance battery containing a graphite material preferable for its flatness of potential and propylene carbonate preferable for its low temperature characteristic can be obtained. More specifically, it is no longer necessary to coat with less crystallized carbon the entire active surface of graphite particles believed to inevitably cause decomposition of propylene carbonate, thus the ratio of graphite relative to the less crystallized carbon may be increased, and therefore a high capacity battery may be obtained.

If the surface of graphite particles is exposed to some extent through the step of grinding or classifying after coating the graphite particles with the less crystallized carbon, resulting decomposition of the electrolyte is not great based on the combination of the negative electrode material and the electrolyte according to the present invention. Therefore, the flexibility in the method of manufacturing a composite carbon material formed by coating graphite particles with less crystallized carbon increases.

Furthermore, while the present invention is useful in view of improvement of the yield of batteries even if graphite particles are entirely coated with less crystallized carbon, particularly preferable effects are provided for the case in which the coating ratio of the surface of graphite particles with less crystallized carbon is less than 100%.

In the following various embodiments, the sizes Lc and La of crystallite were measured by means of a well known wide angle X-ray diffraction method. At the time, K=0.9 was used as a form factor for producing the size of crystallite. The particle size was measured with a laser diffraction particle size analyzer MODEL SALD-1000 (SHIMADZU CORPORATION) as a particle size having a peak in a particle size distribution. The value R was produced by means of Raman spectroscopic measurement using an argon laser beam having a wavelength of 514.5 nm.

Embodiment 1

As graphite particles, natural graphite particles produced in Madagascar (flaky, particle size=11 $\mu$m. $d_{002}$=0.337 nm, Lc=27 nm, La=17 nm, R=0.15, specific surface area=8 $m^2$/g) were used and chemical vapor deposited carbon was deposited on the surface of graphite particles according to the following method.

As shown in FIG. 1, 100 mg of graphite particles were placed on a sample stage 6 of an electric furnace including a quartz tube 5 and a heater 7. An argon gas and a propane gas were supplied through an argon supply line 1 and a propane supply line 2, and the density of propane, a material gas was controlled to be 0.13 mol % by manipulating needle valves 3 and 4. The speed of the material gas proceeding through quartz tube 5 was 0.64 cm/min, and the amount of propane supplied was 0.03 mol/h. Then graphite powder on sample stage 6 was heated to 800° C. by heater 7, and propane supplied from a gas inlet 8 into quartz tube 5 and let out from a gas outlet 9 was thermally decomposed to deposit CVD carbon on the surface of graphite particles. The deposition took three hours, and the weight of graphite particles was increased by 6 mg. In other words, for the CVD carbon (less crystallized carbon), the weight ratio of "less crystallized carbon/(less crystallized carbon+ graphite)" was 0.057, approximately 0.06.

The graphite particles coated with the CVD carbon had crystal parameters such as particle size of 13 gm, $d_{002}$=0.337 mm, Lc=27 mm, La=17 mm and R=0.52. Considering these crystal parameters based on the X-ray measurement which reflects the property of the bulk of particles and based on the Raman spectroscopic method which reflects the property of the surface of particles, it is recognized that the graphite particles coated with CVD carbon maintained the property of the bulk of high crystallinity and a less crystallized surface layer.

The thus-obtained coated graphite powder was mixed with an N-methyl-2-pyrrolidone solution containing 10 weight parts of polyvinylidene fluoride relative to 100 weight parts of the coated graphite and made into slurry, which was applied on a copper foil having a thickness of 20 gm. The slurry applied on the copper foil was dried at 60° C. for 1 hour, and removed of N-methyl-2-pyrrolidone in the solvent by drying under reduced pressure at 150° C., and then a negative electrode was formed by attaching a collector tab to the copper foil. The negative electrode was dried under reduced pressure at 150° C. for 5 hours, and then evaluated in a glove box including argon.

Figure 2:
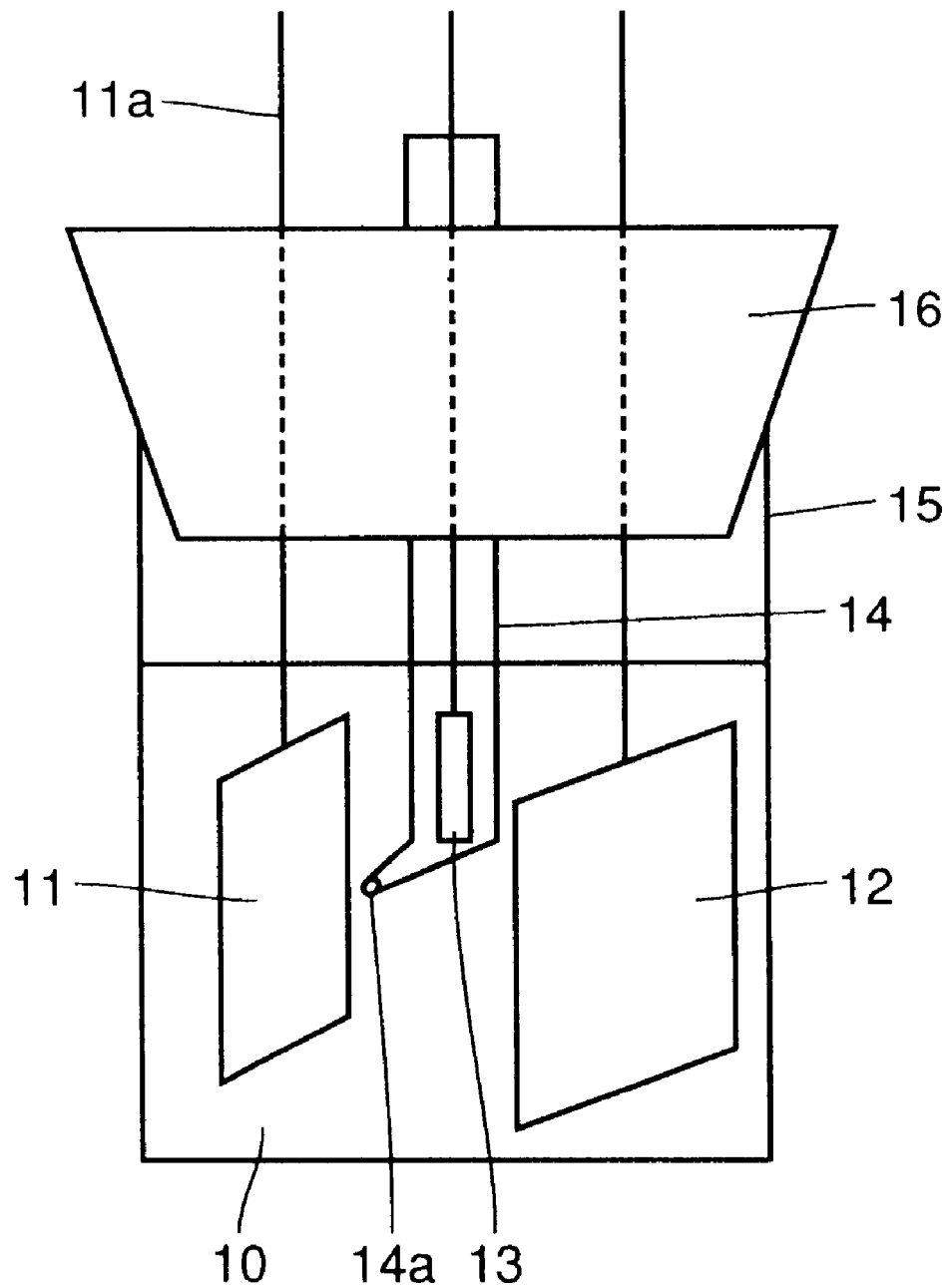
FIG. 2 is a schematic diagram for use in illustration of a three-electrode method for evaluating a working electrode.

The evaluation of the electrode was carried out according to a 3-electrode method as illustrated in FIG. 2, and the result is shown in Table 1.

TABLE 1

| $\frac{PC}{PC + EC}$ | Embodiment | | Comparison Example | |
|---|---|---|---|---|
| | discharge capacity mAh/g | charge/discharge efficiency % | discharge capacity mAh/g | charge/discharge efficiency % |
| 1 | 5 | 3.2 | 0 | 0.1 |
| 0.9 | 300 | 75 | 60 | 5 |
| 0.8 | 302 | 76 | 110 | 31 |
| 0.67 | 305 | 79 | 140 | 42 |
| 0.57 | 312 | 80 | 180 | 58 |
| 0.5 | 320 | 83 | 318 | 66 |
| 0.4 | 315 | 82 | 301 | 64 |
| 0.2 | 321 | 83 | 307 | 71 |
| 0.1 | 311 | 85 | 311 | 77 |
| 0 | 322 | 84 | 313 | 79 |

In FIG. 2, an electrolyte 10 was retained in a container 15 with a cap 16. A working electrode 11 to be tested and an counter electrode 12 of lithium were placed in electrolyte 10 at a prescribed distance apart from each other. A reference electrode 13 of lithium in a Luggin tube 14 was placed between working electrode 11 and counter electrode 12. Luggin tube 14 had a lower end tapered toward working electrode 11 and the lower end had an opening 14a at its tip. More specifically, electrolyte 10 came into the Luggin tube through opening 14a and reference electrode 13 was also soaked in electrolyte 10. The working electrode was evaluated by a flowing current from the collector tab through a lead line 11a.

As the electrolyte, a solution having 1 mol/dm³ lithium perchlorate dissolved in a mixture solvent containing propylene carbonate, ethylene carbonate and diethylcarbonate was used. The ratio of propylene carbonate plus ethylene carbonate to diethylcarbonate by volume was 1:1. The ratio of propylene carbonate (PC) and ethylene carbonate (EC) by volume is shown in Table 1.

In a charge/discharge test, charging was initially carried out at a current density of 30 mA/g per unit weight of carbon between electrode 11 and counter electrode 12. The charging was continued until the voltage of working electrode 11 with respect to reference electrode 13 became 0 V. Then, discharging was carried out at the same current density until the voltage of the working electrode with respect to reference electrode 13 became 1.5 V. The result of the initial cycle of such charge/discharge test is shown in Table 1 and FIG. 3.

Comparison Example 1

A negative electrode was manufactured under the same conditions as Embodiment 1 except that the natural graphite produced in Madagascar as described above was used as is as a carbon material without coating, and the negative electrode was evaluated. The result of Comparison Example 1 is also shown in Table 1 and FIG. 3.

Figure 3:
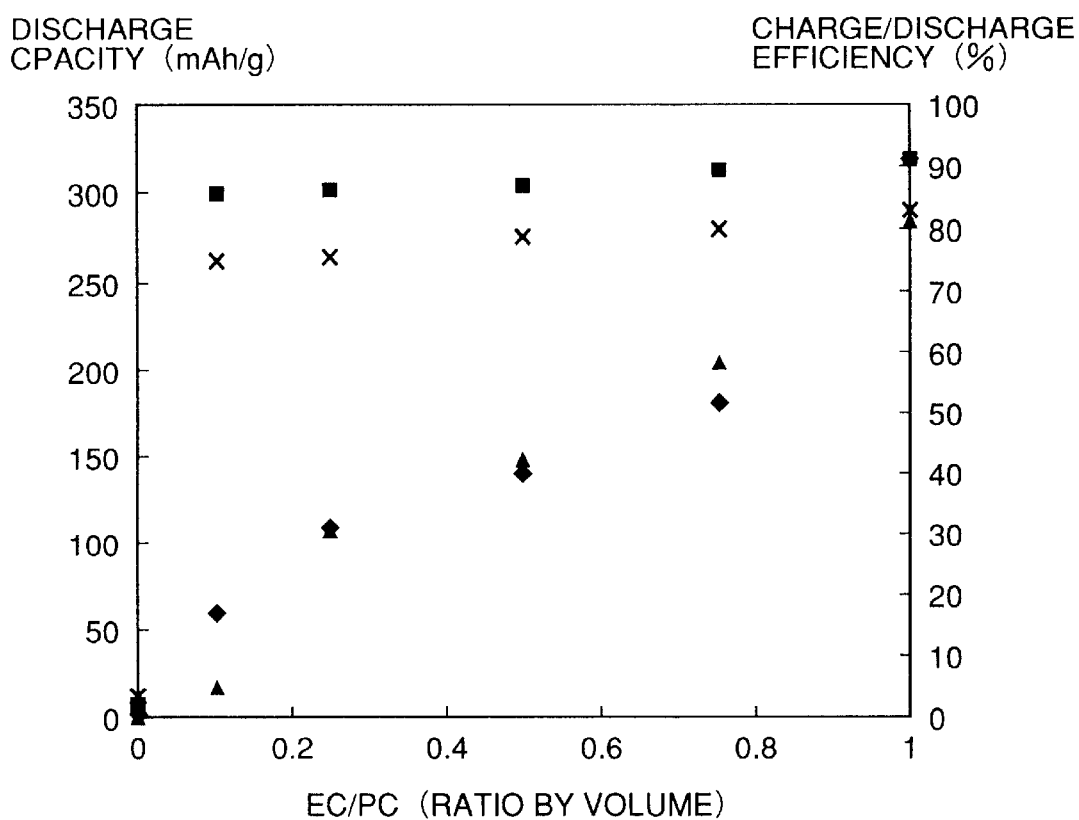
FIG. 3 is a graph showing discharge capacity and charge/discharge efficiency in Embodiment 1 of the present invention and Comparison Example 1.

As can be seen from Table 1 and FIG. 3, use of a negative electrode containing graphite particles coated with less crystallized carbon and a solution containing a mixture solvent of ethylene carbonate and propylene carbonate as an electrolyte provides high discharge capacity. The effect is particularly notable when the ratio of PC/(PC+EC) by volume is not more than 0.5.

Embodiments 2 to 9 and Comparison Example 2

In Embodiments 2 to 9 and Comparison Example 2 shown in Table 2, carbon materials having various weight ratios of "less crystallized carbon/(less crystallized carbon +graphite)" were fabricated by changing the time for depositing CVD carbon in the same process as Embodiment 1. Using these carbon materials, electrodes in Embodiments 2 to 9 and Comparison Example 2 were manufactured and evaluated according to the same process as Embodiment 1. Note however that an electrolyte used for evaluating these electrodes contained propylene carbonate, ethylene carbonate and diethylcarbonate in the ratio of 1:1:2 by volume.

TABLE 2

| | less crystallized carbon / less crystallized carbon + graphite | discharge capacity mAh/g | charge discharge efficiency % |
|---|---|---|---|
| Embodiment 2 | 0.003 | 335 | 72 |
| Embodiment 3 | 0.01 | 331 | 74 |
| Embodiment 4 | 0.05 | 328 | 75 |
| Embodiment 5 | 0.09 | 309 | 77 |
| Embodiment 6 | 0.11 | 298 | 76 |
| Embodiment 7 | 0.14 | 281 | 75 |
| Embodiment 8 | 0.18 | 270 | 72 |
| Embodiment 9 | 0.2 | 285 | 74 |
| Comparison Ex. 2 | 0.23 | 258 | 75 |
| Comparison Ex. 3 | 0.15 | 232 | 76 |
| Comparison Ex. 4 | 0.06 | 311 | 43.2 |
| Comparison Ex. 3 | 0.003 | 2 | 0.3 |

Comparison Example 3

CVD carbon was deposited on the surface of graphite particles under the same conditions as Embodiment 1 except that less crystallized artificial graphite particles formed by baking coke (particle size=18 μm, $d_{002}$=0.342 nm, Lc=3 nm, La=2 nm, R=1.1, specific surface area =5 m²/g) were used. The weight ratio of "less crystallized carbon/(less crystallized carbon+graphite)" was 0.15. The coated graphite particles had crystal parameters such as particle size of 21 μm, $d_{002}$=0.342 nm, Lc=3 nm, La=2 mn, R=1.2, and specific surface area of 8 m²/g. An electrode was fabricated and evaluated similarly to the case of Embodiment 1 using the carbon material as an active material. Note that an electrolyte the same as the cases of Embodiments 2 to 9 was used. The result of evaluation of the electrode by Comparison Example 3 is also shown in Table 2.

Comparison Example 4

Graphite powder coated with CVD carbon under the same conditions as the case of Embodiment 1 was baked at 2500° C. in an inert atmosphere for 10 hours. Thus obtained carbon material had crystal parameters such as particle size of 13 μm, $d_{002}$=0.337 nm, Lc=27 nm, La=17 nm and R=0.33. The carbon material was used to manufacture an electrode similarly to the case of Embodiment 1 and the electrode was evaluated. Note that an electrolyte the same as the cases of Embodiments 2 to 9 was used. The result of evaluation of the electrode by Comparison Example 4 is also shown in Table 2.

As can be seen from the results of evaluation related to Embodiments 2 to 9 and Comparison Example 2 shown in Table 2, for the weight ratio of "less crystallized carbon/(less crystallized carbon+graphite)" set to 0.2 or less, the discharge capacity per unit weight of the carbon material can be 270 mAh/g or higher. As can be seen from the result of Comparison Example 3, if graphite particles with low crystallinity were used in place of graphite particles with high crystallinity, a sufficient discharge capacity is not obtained. Also as can be seen from Comparison Example 4, if the cyrstallinity of CVD carbon coating graphite particles was increased by a heat treatment at a high temperature, propylene carbonate is caused to decompose, and the charge/discharge efficiency at the initial charge/discharge cycle which includes a partially irreversible reaction greatly deteriorates.

Comparison Example 5

The electrode obtained in Example 2 was evaluated using an electrolyte containing propylene carbonate and diethylcarbonate in the ratio of 1:1 by volume. The result of evaluation of the electrode in Comparison Example 5 is also shown in Table 2. In the electrode by Comparison 5, since the surface of graphite particles was not sufficiently coated with CVD carbon, charging/discharging is almost disabled in the electrolyte without ethylene carbonate. Stated differently, if an electrode containing graphite particles insufficiently coated with CVD carbon as the case of Comparison Example 5 is used, a high discharge capacity results by using an electrolyte containing a solvent with PC/(PC+EC)=0.5 as in the case with Embodiment 2.

Embodiment 10

CVD carbon was deposited on the surface graphite particles under the same conditions as Embodiment 1 except that artificial graphite powder KS25 produced by Lonza Ltd. (spherical, particle size=18 μm, $d_{002}$=0.336 nm, Lc=15 nm, La=12 nm, R=0.36, specific area=7.6 m²/g) was used as graphite particles. The ratio of "less crystallized carbon/(less crystallized carbon+graphite)" by volume was 0.12. The thus-obtained carbon material had crystal parameters such as particle size of 19 μm, $d_{002}$=0.336 nm, Lc=15 nm, La=12 nm, R=0.69 and specific surface area of 4.2 m²/g. An electrode was manufactured and evaluated according to the same process as the case of Embodiment 1 except that a binder PVDF in 15 weight parts relative to 100 weight parts of carbon powder having such property values was added. In an electrolyte used for evaluating the electrode, PC:EC was 1:1, and the ratio of a third solvent (diethylcarbonate (DEC) in this case) relative to the whole solvent was changed in various ways.

In Table 3, the result of evaluating the electrode by Embodiment 10 is shown, charging/discharging was carried out at a normal temperature of 25° C. as in the case with Embodiment 1, and also at a low temperature of -20° C. In Table 3, the low temperature characteristic of the electrode was represented as the ratio of discharge capacity at -20° C. relative to the discharge capacity at 25° C. Note that the electrodes with smaller discharge capacity at 25° C. were omitted from evaluation in terms of a low temperature characteristic.

As can be seen from Table 3, the discharge capacity decreases extremely little at the low temperature as the ratio of diethyl carbonate relative to the whole solvent is within the range of 0.2 to 0.8.

TABLE 3

| DEC | Embodiment 10 | | | Comparison Example 6 | | |
|---|---|---|---|---|---|---|
| whole solvent | discharge capacity mAh/g | charge/discharge efficiency % | ratio by volume [-20° C./25° C.] | discharge capacity mAh/g | charge/discharge efficiency % | ratio by volume [-20° C./25° C.] |
| 0 | 302 | 69.7 | 0.73 | 260 | 53 | 0.62 |
| 0.2 | 312 | 72.3 | 0.9 | 176 | 48 | 0.84 |
| 0.33 | 308 | 81.2 | 0.92 | 162 | 38 | 0.83 |
| 0.5 | 305 | 79 | 0.96 | 140 | 42 | 0.87 |
| 0.6 | 315 | 82.3 | 0.98 | 182 | 52 | 0.88 |
| 0.8 | 320 | 83.4 | 0.95 | 220 | 63 | 0.86 |
| 1 | 53 | 36 | — | 22 | 18 | — |

An electrode was manufactured and evaluated similarly to the case of Embodiment 10 except that artificial graphite KS25 produced by Lonza Ltd. (flaky, particle size=14 μm, $d_{002}$=0.336 nm, Lc=22 nm, La=15 nm, R=0.2, specific surface area=10.3 m²/g) was used as an active material for the negative electrode. The result of Comparison Example 6 is shown in Table 3. As can be seen from comparison between Embodiment 10 and Comparison Example 6 in Table 3, a high discharge capacity and a high charge/discharge efficiency result using a negative electrode containing graphite particles coated with CVD carbon and an electrolyte containing diethylcarbonate as a low viscosity third solvent in addition to ethylene carbonate and propylene carbonate in a ratio by volume larger than 0 and equal to or lower than 0.8 relative to the whole solvent. In order to prevent discharge capacity at the low temperature from being reduced, the ratio by volume of the third solvent relative to the whole solvent is preferably within the range from 0.2 to 0.8.

Embodiment 11

Artificial graphite powder KS25 produced by Lonza Ltd. (flaky, particle size=14 μm, $d_{002}$=0.336 nm, Lc=22 nm, La=15 nm, R=0.2, specific surface area=1.5 m²/g) as graphite particles was mixed with pitch. The mixed material was retained in a nitrogen atmosphere at 300° C. for 2 hours using an electric furnace and then baked at 1000° C. for 3 hours. The thus-baked mixed material was lightly ground in a mortar into active material powder for a negative electrode. The thus-obtained active material powder had crystal parameters such as particle size of 18 μm, $d_{002}$=0.336 nm, Lc=22 nm, La=15 nm, R=0.75, and specific surface area of 3.8 m²/g. Using the powder, an electrode was manufactured and evaluated according to the same process as Embodiment 1. Note however that the ratio of propylene carbonate and ethylene carbonate in an electrolyte used for evaluating the electrode was 1:1. The result of evaluation of the electrode by Embodiment 11 is shown in Table 4.

Comparison Example 7

An electrode identical to the one obtained by Embodiment 11 was evaluated similarly to the case of Embodiment 11 except that an electrolyte used did not contain ethylene carbonate. The result of Comparison Example 7 is also shown in Table 4.

Comparison Example 8

An electrode was manufactured and evaluated similarly to the case of Embodiment 12 except that the artificial graphite powder KS25 produced by Lonza ltd. (flaky, particle size= 14 μm, $d_{002}$=0.336 nm, Lc=22 nm, La=15 nm, R=0.2, specific surface area=10.3 m²/g) was used as a negative electrode active material. The result of evaluation of the electrode by Comparison Example 8 is also shown in Table 5.

TABLE 4

|  | discharge capacity mAh/g | charge/discharge efficiency % |
|---|---|---|
| Embodiment 11 | 312 | 78 |
| Comparison Example 7 | 15 | 0.3 |

As in the foregoing, if less crystallized carbon for coating the surface of the graphite particles is formed by baking from a liquid phase containing carbon, the baked material must be ground, because the particles coagulate with each other. In such a process of grinding, part of the surface of

TABLE 5

| | | | | Embodiment 12 | | | Comparison Example 8 | | |
|---|---|---|---|---|---|---|---|---|---|
| EC whole solvent | PC whole solvent | PC PC + EC | EMC whole solvent | discharge capacity mAh/g | charge/discharge efficiency % | capacity ratio [−20° C./25° C.] | discharge capacity mAh/g | charge/discharge efficiency % | capacity ratio [−20° C./25° C.] |
| 0.5 | 0 | 0 | 0.5 | 332 | 86.3 | 0.788 | 311 | 82.3 | 0.554 |
| 0.5 | 0.5 | 0.5 | 0 | 315 | 74.4 | 0.85 | 298 | 42 | 0.688 |
| 0.4 | 0.4 | 0.5 | 0.2 | 304 | 80.1 | 0.902 | 282 | 32 | 0.653 |
| 0.3 | 0.2 | 0.4 | 0.5 | 329 | 84.5 | 0.913 | 295 | 65.2 | 0.613 |
| 0.25 | 0.25 | 0.5 | 0.5 | 323 | 84.8 | 0.987 | 285 | 53.1 | 0.658 |
| 0.1 | 0.4 | 0.8 | 0.5 | 316 | 82.6 | 0.994 | 15 | 1.3 | — |
| 0.2 | 0.2 | 0.5 | 0.6 | 328 | 82.2 | 0.933 | 278 | 46.7 | 0.702 |
| 0 | 0.5 | 1 | 0.5 | 32 | 13 | — | 0.2 | 0.1 | — | graphite particles is exposed, and therefore, in Example 7 using an electrolyte without ethylene carbonate, as shown in Table 4, charging/discharging is almost disabled by decomposition of propylene carbonate. While in the case of Embodiment 11 using an electrolyte containing equal amounts of ethylene carbonate and propylene carbonate, a high discharge capacity results. Considering this together with the result of Comparison Example 1 shown in Table 1, it is apparent that high capacity can be obtained for graphite particles coated with less crystallized carbon even using an electrolyte in a composition believed to be unpractical in the case of using uncoated graphite particles. More specifically, if a carbon material and an electrolyte are appropriately combined, a high charge/discharge capacity in a negative electrode can be obtained.

Embodiment 12

An electrode manufactured in the same manner as Embodiment 11 was evaluated using an electrolyte containing a solvent in the composition shown in Table 5 and 1 mol/l $LiClO_4$ as an electrolytic salt. The evaluation of the electrode includes low temperature characteristic evaluation as in Embodiment 10. The result of evaluating the electrode by Embodiment 12 is shown in Table 5.

As can be seen from Embodiment 12 in Table 5, a good low temperature characteristic for an electrode can be obtained when the amount of EC relative to the whole solvent is more than 0 and 0.4 or less in a ratio by volume. When PC/(PC+EC) is within the range from 0.8 to 0.4, a negative electrode with overall good characteristics can be obtained. Meanwhile, as in the case of Comparison Example 8, combining a negative electrode using graphite particles as is and an electrolyte containing a solvent having a composition as shown in Table 5 does not provide a battery having values satisfactory in all of the discharge capacity, charge/discharge efficiency and low temperature characteristic. In view of the charge/discharge efficiency at the first cycle, the ratio of amount of PC relative to the entire solvent in an electrolyte is preferably 0.4 or less by volume.

When Embodiment 12 and Comparison Example 8 are compared as to the same composition of electrolyte, Embodiment 12 exhibits a better low temperature characteristic for all the compositions of electrolyte. As a result, it is recognized that the low temperature characteristic is obtained not simply as a result based on the difference in the ion conductivity of electrolyte, and that a battery with a good temperature characteristic can be implemented by appropriately combining an electrolyte and coated graphite particles. This is believed to be based on the difference in reaction mechanism between the case in which Li ions intercalate from the surface of graphite with high crystallinity and the case in which Li ions intercalate into graphite crystals through a less crystallized carbon material.

Embodiments 13 to 16

Graphite particles coated with CVD carbon were manufactured under the same condition as Embodiment 1 except that natural graphite produced in the former Soviet Union (flaky, particle size=13 μm, $d_{002}$=0.336 nm, Lc=21 nm, La=16 nm, R=0.18, specific surface area=11.8 $m^2$/g) was used as graphite particles. The weight ratio of "less crystallized carbon/(less crystallized carbon+graphite)" in these coated graphite particles was 0.08. These coated graphite particles had crystal parameters such as particle size of 18 μm, $d_{002}$=0.336 nm, Lc=22 nm, La=15 nm, R=0.42 and specific surface area of 4.8 $m^2$/g. The negative electrode was fabricated and evaluated similarly to the case of Embodiment 1 except that 18 weight parts of a binder relative to 100 weight parts of thus-obtained negative electrode active material were added. Note however that an electrolyte containing equal amounts of PC and EC as well as a third solvent as much as 50% of the whole solvent (except Embodiment 13) was used. As the third solvent, diethyl carbonate (DEC), dimethyl carbonate (DMC) or ethylmethyl carbonate (EMC) was used. The results of evaluating electrodes by Embodiments 13 to 16 are shown in Table 6.

black as a conductive material, and 10 parts by weight of polytetrafluoroethylene powder as a binder were mixed and shaped into a pellet having a diameter of 15 mm. The pellet-shaped positive electrode had a thickness of 0.8 mm. A negative electrode was manufactured under the same conditions as Embodiment 1 and then punched out into a disk shape having a diameter of 15 mm and a thickness of 0.5 mm. Using thus obtained positive and negative electrodes, a coin-shaped battery (diameter=20 mm, thickness=2 mm) as shown in FIG. 4 was manufactured.

Figure 4:
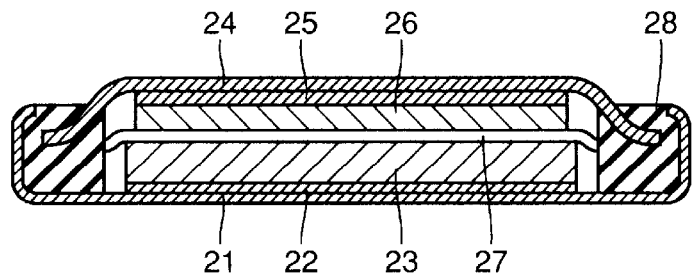
FIG. 4 is a cross sectional view schematically showing an example of coin type battery according to the present invention.

In the manufacture of the battery shown in FIG. 4, in a can for positive electrode 21 a current collector for positive electrode 22 was welded onto the bottom surface and an insulating packing 28 was placed along the periphery. A positive electrode 23 was pressure-bonded on positive electrode current collector 22. A separator 27 is placed on positive electrode 23, which was impregnated with an electrolyte. Meanwhile, a negative electrode current collector 25 was welded onto the inner surface of a can 24 for negative electrode, on which a negative electrode 26 was pressure-bonded. Then, a coin type battery was manufactured by joining positive electrode can 21 and negative electrode can 24 through insulating packing 28 such that separator 27 and negative electrode 26 are in contact. Non-woven fabric of propylene was used for separator 27, and an electrolyte impregnated into the non-woven fabric contained a mixture solvent containing propylene carbonate, ethylene carbonate and diethylcarbonate in the ratio of 1:1:2 by volume and an electrolyte of 1 mol/$dm^3$ $LiPF_6$. In order that the capacity of

TABLE 6

|  | 3rd solvent | discharge capacity mAh/g | charge/discharge efficiency % | low temperature characteristic capacity ratio [−20° C./25° C.] |
|---|---|---|---|---|
| Embodiment 13 | none | 315 | 74.4 | 0.85 |
| Embodiment 14 | DEC | 305 | 79 | 0.92 |
| Embodiment 15 | DMC | 315 | 77.5 | 0.93 |
| Embodiment 16 | EMC | 323 | 84.8 | 0.99 |

As shown in Table 6, use of the electrolyte containing equal amounts of PC and EC provides a good low temperature characteristic for an electrode, and use of an electrolyte containing an additional third solvent further improves the discharge capacity, charge/discharge efficiency and low temperature characteristic. As can be seen from comparison in Embodiments 14 to 16, particularly good discharge capacity, charge/discharge efficiency and low temperature characteristic can be obtained by using ethylmethyl carbonate as the third solvent.

Embodiment 17

A positive electrode is generally manufactured by mixing a positive electrode material, a conductive material and a binder. As such a conductive material, a carbon material such as carbon black and graphite or a metal material such as metal powder and metal wool is used. Although the binder may be mixed in the form of powder, binder powder dispersed in a solution or a binder dissolved in a solution may be used in order to improve the binding ability by increasing its dispersibility. If such a solution containing a binder is used, the solvent should be removed by a vacuum treatment or a heat treatment. The binding ability of a certain binder may be improved by a heat treatment at a temperature in the vicinity of its melting point.

In Embodiment 17, 100 parts by weight of $LiNiO_2$ as a positive electrode material, 10 parts by weight of acetylene the battery shown in FIG. 4 is controlled by the capacity of negative electrode 26, positive electrode 23 contained a slightly excessive amount of positive electrode material. To the thus-manufactured battery, charge/discharge tests were carried out at various temperatures at a rated current of 1 mA and at a discharge potential in the range from 2.7 to 4.1V. The temperature dependence of the capacity of the battery in Embodiment 17 is shown in Table 7.

Embodiment 18

A coin type battery was manufactured and evaluated similarly to the case of Embodiment 17 except that a mixture solvent containing ethylene carbonate, propylene carbonate and ethylmethyl carbonate in the ratio of 1:1:2 by volume was used. The temperature dependence of the capacity of the battery by Embodiment 18 is also shown in Table 7.

Comparison Example 9

A coin type battery was manufactured and evaluated similarly to the case of Embodiment 17 except that a mixture solvent containing ethylene carbonate and diethylcarbonate in the ratio of 1:1 by volume was used. The temperature dependence of the capacity of the battery by Comparison Example 9 is also shown in Table 7.

TABLE 7

| temperature for measuring | Embodiment 17 mAh | Embodiment 18 mAh | Comparison Example 9 mAh |
|---|---|---|---|
| 40 | 18 | 19 | 18 |
| 20 | 17 | 18 | 17 |
| 0 | 15 | 16 | 12 |
| −20 | 10 | 13 | 5 |
| −40 | 8 | 11 | — |

As shown in Table 7, in Comparison Example 9 in which the electrolyte contains equal amounts of ethylene carbonate and diethylcarbonate, the capacity of the battery at −40° C. was too small to measure, but the battery by Embodiment 17 whose electrolyte contains propylene carbonate, ethylene carbonate, diethylcarbonate in the ratio of 1:1:2 by volume is operable at −40° C. and can be applied in a wide range of temperatures. The battery by Embodiment 18 containing ethylmethyl carbonate in place of diethylcarbonate as the third solvent in Embodiment 17 exhibits an even better low temperature characteristic.

Embodiment 19

Coated graphite particles were obtained under the same conditions as Embodiment 1 except that natural graphite produced in the former Soviet Union the same as the cases of Embodiments 13 to 16 was used, and that CVD carbon was deposited for 6 hours. The weight ratio of "less crystallized carbon/(less crystallized carbon+graphite)" in thus obtained coated graphite particles was 0.11. The carbon material had crystal parameters such as particle size of 16 μm, $d_{002}$=0.336 nm, Lc=21 nm, La=17 nm, and R=0.82. Using the graphite material, an electrode was fabricated and evaluated according to the same process as Embodiment 1. The electrolyte contained a mixture solvent of equal amounts of propylene carbonate and diethylcarbonate and a solute of 1 mol/dm³ lithium perchlorate. In the evaluation of the electrode by Embodiment 19, the discharge capacity was 295 mAh/g and the charge/discharge efficiency at the first cycle was 75.6%. It was therefore confirmed that a sufficient capacity may be obtained using an electrolyte without ethylene carbonate.

In order to manufacture a battery using such as carbon material, after preparing a carbon material to have an even particle size, 8 weight parts of PVDF as a binder was added to 100 weight parts of the carbon material as an active material, then N-methyl-2-pyrrolidone was added and mixed into paste for a negative electrode. The paste was applied on a copper foil having a thickness of 18 μm using a doctor blade device, dried, and pressed by a roller press, and a negative electrode was obtained. The negative electrode was punched out into a disk having a diameter of 15 mm, and 20 coin type batteries the same as Embodiment 17 were manufactured. Charge/discharge testing was conducted to the coin type batteries under the same charge/discharge conditions as Embodiment 17. All the tested batteries operated normally, and as a result of observing these batteries after charging/discharging for 20 cycles, no swell was observed in the battery. The battery which exhibited the highest capacity at 20° C. was measured for its capacity at −20° C., and its low temperature characteristic value as the ratio of the capacity at −20° C. relative to the capacity at −25° C. was 0.980.

Comparison Example 10

Twenty batteries were manufactured in the same manner as Embodiment 19 except that the electrolyte contained a solvent containing equal amounts of propylene carbonate and diethylcarbonate and a solute of 1 mol/dm³ $LiPF_6$. The batteries obtained by Comparison Example 10 were subjected to charge/discharge testing similarly to the case of Embodiment 19, and two batteries could not be charged, and among normally operating batteries, three batteries were observed to be swollen. Furthermore, the battery which exhibited the highest capacity at 25° C. was measured for its capacity at −20° C., and the low temperature characteristic as the ratio of the capacity at −20° C. relative to the capacity at 25° C. was 0.983.

The result clearly shows that a decomposition reaction of the electrolyte is actually caused precededly on the surface of graphite. Therefore, even for the case of a negative electrode including coated graphite particles by Embodiment 19 which was confirmed to be capable of charging/discharging using an electrolyte containing equal amounts of propylene carbonate and diethyl carbonate, if a battery is fabricated combining the negative electrode and an electrolyte in practice, the yield of the batteries is improved by additionally including ethylene carbonate in the electrolyte. This is probably because in the steps of sorting coated graphite particles to have the same size, mixing the coated graphite particles with a binder into slurry, applying the slurry on a copper foil, and pressing upon assembling a battery, the less crystallized carbon coating the surface of graphite particles comes off to partially expose the active surface of the graphite particles, and decomposition of propylene carbonate is caused as a result. It was also confirmed that the low temperature characteristic by Embodiment 19 is not different from that of Comparison Example 10 and has no problem in practice.

As in the foregoing, according to the present invention, a battery including a graphite material with good flatness of potential and a good low temperature characteristic can be provided. More specifically, using an electrolyte having a composition according to the present invention, it is no longer necessary to coat the entire active surface of graphite particles which was believed to cause decomposition of propylene carbonate with less crystallized carbon, and the ratio of graphite relative to less crystallized carbon may be increased, and therefore a battery with a higher capacity can be obtained.

In addition, if the active surface of graphite particles is partially exposed in the process of grinding after coating the surface of graphite particles with less crystallized carbon, the electrolyte having the composition according to the present invention will not be greatly decomposed by the partially exposed graphite surface and therefore increased flexibility related to a method of manufacturing graphite particles whose surface is coated with less crystallized carbon results. Note that according to the invention, the yield of the batteries may be improved even if the surfaces of graphite particles are entirely coated with less crystallized carbon; the preferable effects brought about by the invention are particularly exhibited if the surfaces of graphite particles are less than 100% coated with such less crystallized carbon.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A nonaqueous secondary battery comprising:
   a negative electrode including graphite particles coated with carbon having a lower crystallinity than graphite, wherein at least a portion of said graphite particles are only partially coated with said carbon having a lower crystallinity than graphite, and a nonaqueous electrolyte, said electrolyte comprising ethylene carbonate (EC) and propylene carbonate (PC).

2. The nonaqueous secondary battery as recited in claim 1, wherein:
   an interlayer spacing $d_{002}$ between (002) planes of said graphite particles is in the range from 0.335 nm to 0.340 nm, the thickness of crystallite Lc in a direction orthogonal to (002) plane is not less than 10 nm, and the thickness of crystallite La in a direction orthogonal to (110) plane is not less than 10 nm; and
   said graphite particles have a value of not more than 0.4 as the intensity ratio R of a peak at 1360 $cm^{-1}$ relative to a peak at 1580 $cm^{-1}$ in argon laser scattering having a laser wavelength of 514.5 nm.

3. The nonaqueous secondary battery according to claim 2, wherein the intensity ratio R of said graphite particles coated with carbon having a lower crystallinity than graphite is larger than 0.4.

4. The nonaqueous secondary battery as recited in claim 1, wherein
   in said graphite particles coated with carbon having a lower crystallinity than graphite, the weight ratio of said carbon having a lower crystallinity than graphite to the sum of said carbon having a lower crystallinity than graphite and graphite is not more than 20%.

5. The nonaqueous secondary battery as recited in claim 1, wherein
   the ratio of PC/(PC+EC) by volume in said electrolyte is in the range of 0.1 to 0.9.

6. The nonaqueous secondary battery as recited in claim 5, wherein
   the ratio of PC/(PC+EC) by volume in said electrolyte is in the range of 0.1 to 0.5.

7. The nonaqueous secondary battery as recited in claim 1, wherein
   said electrolyte further comprises a third solvent.

8. The nonaqueous secondary battery recited in claim 7, wherein the ratio of EC/(PC+EC+the third solvent) by volume is not more than 0.4.

9. The nonaqueous secondary battery as recited in claim 7, wherein
   the ratio of PC/(PC+EC) by volume is in the range f 0.2 to 0.5, and the ratio of propylene carbonate relative to the whole solvent by volume is not more than 0.4.

10. The nonaqueous secondary battery as recited in claim 7, wherein
    said third solvent is methylethylcarbonate.

11. The nonaqueous secondary battery as recited in claim 7, wherein said third solvent is less viscous than PC and EC.

12. The nonaqueous secondary battery as recited in claim 1, wherein the ratio of said third solvent relative to the whole solvent by volume is in the range of 0.2 to 0.8.

13. The nonaqueous secondary battery as recited in claim 1, wherein
    said carbon having a lower crystallinity than graphite is deposited by thermal decomposition of a hydrocarbon gas.

14. The nonaqueous secondary battery as recited in claim 1, wherein said carbon having a lower crystallinity than graphite comprises amorphous carbon.

* * * * *

UNITED STATES PATENT AND TRADEMARK OFFICE
CERTIFICATE OF CORRECTION

PATENT NO. : 6,040,092
DATED : March 21, 2000
INVENTOR(S) : YAMADA et al.

It is certified that error appears in the above-identified patent and that said Letters Patent is hereby corrected as shown below:

Title page, item [54] and col.1, The "TYPE" should read as follows:

NONAQUEOUS TYPE SECONDARY BATTERY

Title page, item [56] entitle " OTHER PUBLICATIONS". The reference should read as follows:

"The Study of Li-Graphite Intercalation Processes in Several Electrolyte Systems using In Situ X-Ray Diffraction," J. Electrochem. Soc. Vol. 142, No. 6, June 1995, pp. 1746-1752.

Signed and Sealed this

Twenty-seventh Day of February, 2001

Attest:

NICHOLAS P. GODICI

Attesting Officer

Acting Director of the United States Patent and Trademark Office